Figure 1:
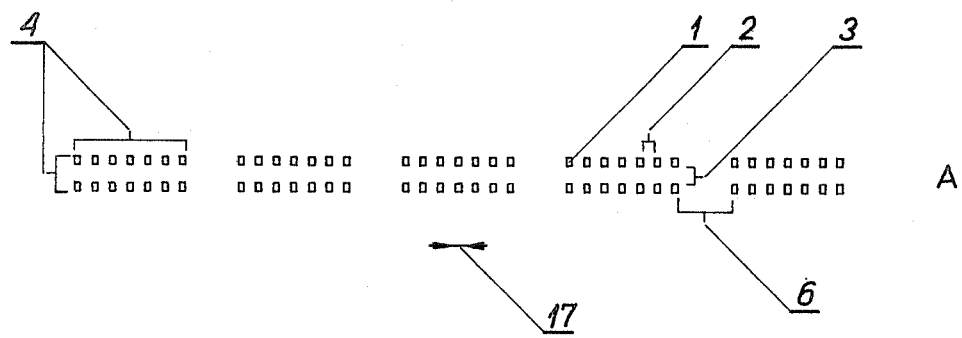
Figure 1:
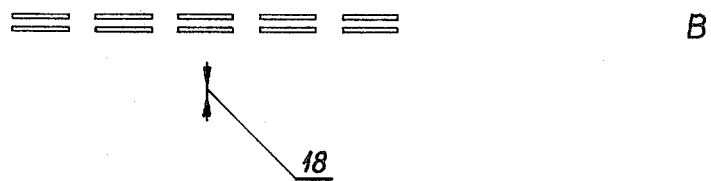
Figure 1:
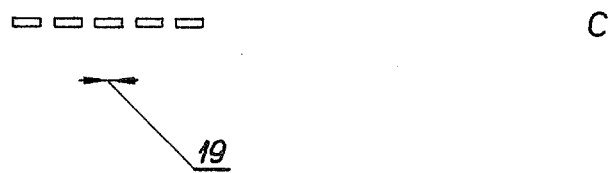
Figure 1:
Figure 1:

United States Patent [19]

Wardecki

[11] 4,245,888
[45] Jan. 20, 1981

[54] UNIVERSAL WARNING STRIP

[75] Inventor: Andrzej Wardeçki, Warsaw, Poland

[73] Assignee: Ministerstwo Komunikacji Department Komunikacji Drogowej of Ul.Chalubinskiego, Warsaw, Poland

[21] Appl. No.: 31,100

[22] Filed: Apr. 18, 1979

[30] Foreign Application Priority Data

Apr. 24, 1978 [PL] Poland .................................. 206358

[51] Int. Cl.³ .............................................. G02B 5/12
[52] U.S. Cl. ......................................... 350/97; 404/14
[58] Field of Search .................................. 350/97–105, 350/307 C; 404/12, 13, 14; 40/370, 502, 542, 550, 556, 588, 583

[56] References Cited

U.S. PATENT DOCUMENTS

| | | | |
|---|---|---|---|
| 3,017,713 | 1/1962 | Butler | 350/97 X |
| 3,582,108 | 6/1971 | Carlton | 350/97 X |
| 3,950,098 | 4/1976 | Caine | 350/97 X |

FOREIGN PATENT DOCUMENTS 918015 2/1963 United Kingdom ...................... 350/97

OTHER PUBLICATIONS

Reflective Rear Marker-Plates, The Motor Vehicles (Rear Markings) Regulations, 1970, 3M.

Primary Examiner—John K. Corbin
Assistant Examiner—B. W. de los Reyes
Attorney, Agent, or Firm—Edwin E. Greigg

[57] ABSTRACT

The device is designed for attaching on the rear parts of automotive vehicles and serves, especially during the night, for visual informing of drivers about the presence, the distance, the width and the length of a preceding vehicle. The device consists of light-reflecting elements, for instance, reflex foil, or of light-emitting elements, for instance, lamps. The said elements 1 arranged in two rows, one above the other, with the same spacing between the said elements, form a single module 4, and a pair of such modules arranged one above the other form a double warning-information module 5. The number of modules in a single strip /FIG. 1/ and in a double strip /FIG. 2/ depends on the width of the vehicle. The elements and all spacings /2, 3, 6, 7/ are selected so that at an increase of the observation distance there occurs multiple apparent joining of light spots into figures of various shapes characteristic of the determined ranges of distance, and at a decrease of the observation distance—the said process proceeds inversely.

1 Claim, 4 Drawing Figures

UNIVERSAL WARNING STRIP

The subject of the invention is a universal warning strip designed mainly for attaching especially on road vehicles, in their rear part, and serving—especially in the night—for visual warning and informing of drivers about the presence of a preceding vehicle and for facilitating the determination of the distance from the said vehicle, changes of the distance, the width of the vehicle, its length, and—to a certain extent—its type or its certain characteristics. The universal warning strip belongs first of all to the field of technique which includes visual warning-signal devices of vehicles.

There are known active warning-signal devices of vehicles, which are light sources mounted in holders and which include first of all position lights, and passive visual warning-signal devices to which reflex devices belong.

Both the aforesaid types of visual warning devices are designed mainly for informing the participants of the road traffic during the night and in unfavourable weather conditions during the day about the presence of vehicles on the road. The other function of the said devices consists in providing information on transverse dimensions of a vehicle, due to the fact that they are installed near the side edges of the vehicle. Moreover, reflex devices serve as safety devices in case when lights are put out or damaged. Some vehicles are provided additionally with warning clearance lights designed for more detailed informing about enlarged transverse dimensions of a vehicle. In general, each of the above mentioned visual warning devices is installed symmetrically in pairs on vehicles.

However, the aforementioned solutions have certain drawbacks. The majority of the drawbacks relate to the fact that vehicles made by various manufacturers and being of various types have various widths and are provided with various warning devices which differ especially in their light characteristics, dimensions, shapes, spacing, etc. When they operated properly, they render it possible to notice a vehicle from a considerable distance, however,—as the result of the aforementioned differentiation of visual warning devices—the estimation of the distance is generally possible only in the last phase of approaching the preceding vehicle, i.e. only when the distance between the vehicles is short or dangerously short. Since the number of road accidents during the night which result from running of a vehicle into the rear of the other vehicle is high, many manufacturers of road vehicles try to prevent this by means of introduction of visual warning devices whose light is more intense, or which reflect the light more intensely, or have larger surfaces. However, this entails other negative consequences, such as a blinding glare which often happens and which limits considerably the ability of estimating the distance from a vehicle, its transverse dimension, as well as the ability of noticing other important details or vehicles which are lighted less strongly. While seeking the methods of increasing the safety in the night road traffic, some countries have come to the conclusion that even the rear number plate with a reflex background can function as an additional visual warning device.

Frequent mistakes and uncertainty as to the real distance from the preceding vehicle result from a difficulty in quick and explicit interpretation of characteristics, interdependencies and changes occurring in a set of signalling elements which is being observed, especially when the vehicle or the road are poorly visible. By means of a distinct but real example it can be stated that the hitherto used two lights or reflex devices of low intensity, small dimensions and small spacing, installed low on a vehicle are usually assumed to belong to a vehicle considerably more distant, as compared to a pair of large, intense, more widely spaced lights which are placed higher over the surface of the road.

For the purpose of safety of the road traffic, for instance, before overtaking a vehicle on a narrow road, it is very important to have a possibility of prior information on the width of the vehicle to be overtaken and on the width of the space it occupies on the road. However, an estimation of the width of a vehicle is possible only from a relatively short distance, i.e. only when its lights or reflex devices are visible as distinctly separated light spots, or when other parts of the vehicle can be distinguished. As it is known, the presently used warning devices provide only approximate information on the transverse dimensions of vehicles, and not on their width, whereas it is the awareness of the width of the preceding vehicle that often determines safety during overtaking and other manoeuvres and facilitates earlier and more detailed estimation of the distance between the two vehicles.

The presently used devices have one more drawback which can disclose itself especially in case of unsymmetrical/i.e. occurring only on one side of a vehicle/complete or partial damage or obstruction of a light or a reflex device. In cases of very unfavourable visibility or in thick road traffic, the driver being behind a vehicle can easily assume that the lights which he sees belong to two different vehicles, or that a vehicle that he sees is narrower than it really is, or that the distance from that vehicle is different than it really is.

Fast development of the number of long vehicles, which is observed in many countries, has intensified also a previously observed problem connected with overtaking of such vehicles, which results from the fact that their length is not distinguished in time. As it is known, none of the presently used visual warning devices, as well as none of the methods of their installing, inform about the length of a vehicle seen from behind. The attempts to solve the said problem consist in placing, on the rear of long vehicles, of reflex plates of various shapes and dimensions provided with oblique two-coloured strips and a plate with an inscription in English—"long vehicle". Sometimes wide vehicles of non-typical purpose or design are marked in a similar way. Not denying certain advantages of such marking, it is however obvious that such solution increases the already excessive differentiation of the forms of rear warning signals of vehicles.

The object of the invention, in its application to vehicles, is to eliminate the aforesaid drawbacks of the presently used visual warning devices installed on vehicles, as well as to provide drivers—by means of the device according to the invention—with new and important, and at the same time more detailed and more easily perceived information on certain characteristics of a vehicle and its position on the road. The purpose of a universal warning strip in its reflex-type embodiment is first of all to replace the reflex devices presently used in vehicles.

Since the universal warning strip is a device comprising a certain number of elements which either emit or reflect light, i.e. it can be either a device lighting by itself or a reflex device, its design and mode of operation being in both versions almost identical, and its purpose—being the same, thus the further description of the invention can refer to the reflex device.

The aforesaid object has been attained due to creation of a special optical signal field consisting of passive or active light elements, the said passive or active light elements being placed on a dark background or on a background which reflects or emits light in a way different from that of the said elements. The said elements are arranged in groups, the spacings between the elements in each group being the same. The groups of elements are arranged in sets of groups, the spacings between the groups in each set being the same, but larger than the spacings between the elements. The sets of groups are arranged in assemblages of sets, wherein spacings between sets are the same but larger than between the groups. A further enlargement of the signal field is obtained in an analogical way, i.e. by means of maintaining larger and larger spacing between the succeeding types of the classes of light elements, both the light elements and the particular types of classes of the elements forming different geometrical figures.

Taking into consideraton the basic purpose of the device according to the invention, i.e. its application in vehicles, the most advantageous solution is such a signal field, wherein a number of reflex elements appropriately selected with respect to shapes, dimensions and abilities of light reflection is placed identically in two horizontal rows, one above the other, with appropriately differentiated spacings between the elements and the rows, thus forming a single warning-information module. By placing of two pairs of the rows of elements /i.e. two single modules/ one above the other, with maintaining an appropriately selected but larger spacing between the said pairs, a double warning-information module is formed. Grouping of a certain number of single modules side by side, i.e. in the horizontal direction, with maintaining of appropriately selected spacing between them, forms a warning strip according to the invention, in a single version. A strip of a double version is formed analogically, i.e. it is formed of double modules placed side by side with the same spacing maintained. The universal warning strip of either version should be placed in a vertical plane or in a slightly deflected plane in relation to the vertical one and should be installed on the rear part of a vehicle. The length of the universal warning strip should be such so as, in application to the width of the vehicle, the signal field thus formed comprised a possibly large, complete number of modules. The universal warning strip in the single version is designed for distinguishing of vehicles of small and medium length, whereas the strip in the double version is designed for distinguishing of long vehicles. Determination of the length of vehicles constituting the limit between the aforesaid two categories should be—after taking into consideration the aspects of the safety of road traffic and the design of vehicles—a subject to an agreement.

Figure 2:
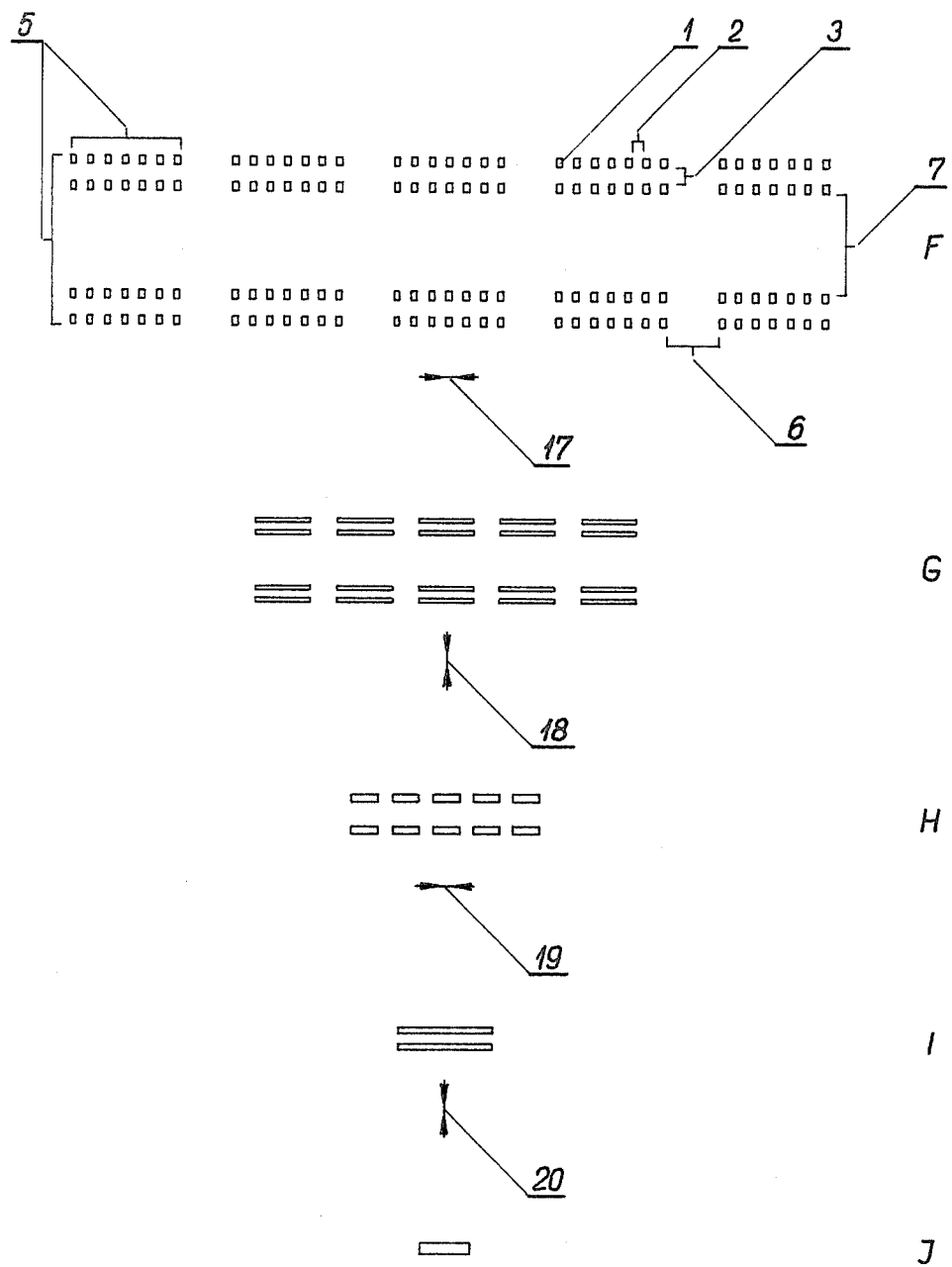
Figure 3:
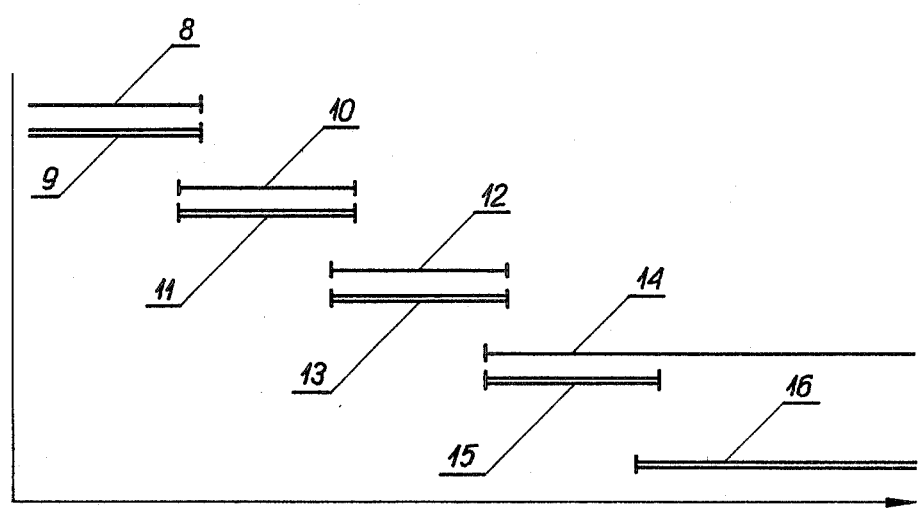
Figure 4:
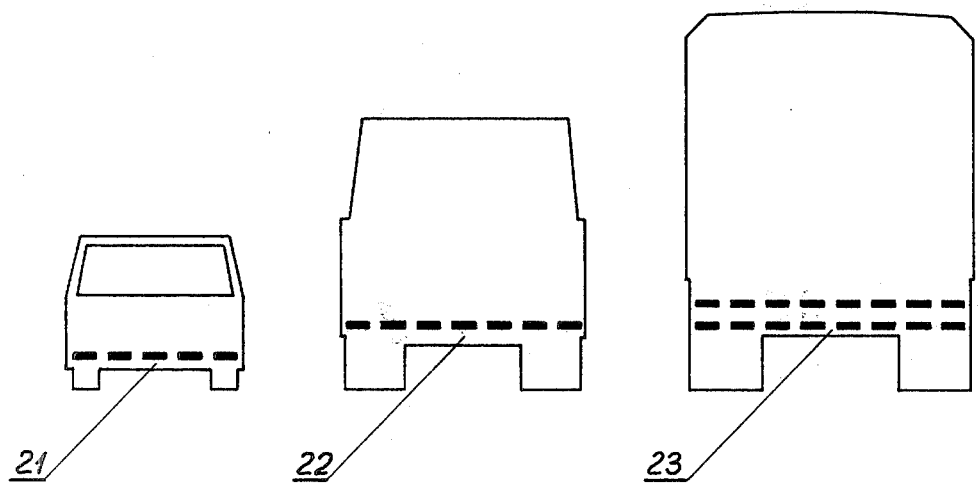

The universal warning strip whose signal field consists, for example, of five modules, its view from various distances and the principle of its application are illustrated by the example of the solution in the drawing, where FIG. 1 shows a single version of the universal warning strip as seen in particular ranges of distinctness, wherein letter A of the figure denotes the strip as seen from an immediate vicinity, i.e. in the first range of distinctness, letter B denotes the same strip as seen in the second range of distinctness, letter C—in the third range of distinctness, letter D—in the fourth range of distinctness, and letter E denotes the same strip also in the fourth range of distinctness, but seen from the distance corresponding to the fifth range of distinctness of the double version of the strip, FIG. 2 shows the double version of the universal warning strip as seen in the particular ranges of distinctness, wherein letter F of the figure denotes the strip as seen from an immediate vicinity, i.e. in the first range of distinctness, letter G denotes the same strip as seen in the second range of distinctness, letter H—in the third range of distinctness, letter I—in the fourth range of distinctness, and letter J—in the fifth range of distinctness, FIG. 3 shows the sequence of positions of the particular ranges of distinctness of both versions of the universal warning strip, depending on the distance between the observer and the strip, and FIG. 4 shows examples of the applicaton of both versions of the universal warning strip on various vehicles.

As it is shown by means of an example in FIG. 1 under letter A and in FIG. 2 under letter F, the universal warning strip in its reflex embodiment, both in the single and in the double version, consists of appropriately arranged reflex elements 1, wherein two horizontal rows of these elements with the same horizontal spacing between the said elements 2 and the same spacing between the said rows 3 form a single warning-information module 4, and a pair of such single modules placed one above the other, at maintaining of an appropriate vertical spacing 7, forms a double warning-information module 5. The universal warning strip comprises an optional, appropriately selected number of horizontally arranged single /in the single version of the strip/ or double /in the double version of the strip/ warning-information modules, the appropriately selected horizontal spacing between modules 6 being the same.

All the aforementioned spacings are appropriately differentiated, the smallest being the spacing 2, the spacing 3 being larger, the spacing 6 being still larger, and the spacing 7 being the largest.

The reflex element 1 in the example of realisation presented herein is a rectangle, however—in order to modify the effects of the device—it can be another geometric figure or a set consisting of several smaller figures.

While observing the universal warning strip in the conditions for which it is mainly designed, i.e. in the night, in the lights of the vehicle from which observation is carried out from an immediate vicinity all details as shown in FIG. 1 under letter A can be distinguished. As the distance increases, details and shapes become simplified, first of all apparent joining of the geometrical figures separated from one another by the smallest spacing is observed. The range of the observation distance from the shortest possible to such at which the observer stops distinguishing the smallest elements 1 and starts seeing them as joined in one unit is called the first range of distinctness, the said range being the same for both versions of the device. In FIG. 3 the first range of distinctness of the single version of the strip is designated 8, and that of the double version is designated 9.

In the second range of distinctness of the single version 10 the strip of the said version is seen in such a way as shown in FIG. 1 under letter B, and in the second range of distinctness of the double version 11 the strip of the said version is seen in such a way as shown in FIG. 2 under letter G.

At further increasing of the observation distance included within the third range of distinctness of the single version 12 and the double version 13, further apparent joining of light spots occurs; in the result of this the universal warning strip of the single version is seen as shown in FIG. 1 under letter C, and in case of the double version—as shown in FIG. 2 under letter H.

When the distance is still larger and is included within the fourth range of distinctness in case of the single version 14 and the double version 15, the view of the device becomes still more simplified and the single version is seen as shown in FIG. 1 under letter D, and the double version—as shown in FIG. 2 under letter I. A further increase of the observation distance will not simplify the view of the strip of the single version, but will only reduce its angular dimensions, as shown in FIG. 1 under letter E. However, the double version of the device will be included in the fifth range of distinctness 16, this corresponding to the view as shown in FIG. 2 under letter J. In the herein presented example of realisation of the universal warning strip the last ranges of distinctness, i.e. the range 14 of the strip of the single version and the range 16 of the strip of the double version do not have a determined limit of their maximum extent.

The essence of the operation and the application of the device according to the invention consists first of all in that dimensions and shapes of the relfex elements 1 and the spacings 2, 3, 6 and 7, as well as the length of modules 4 and 5 are selected so that they cause alternate/i.e. occurring both in the horizontal and the vertical direction/ apparent joining of the light spots which are the closest in relation to one another and which are formed in succession, when the observation distance increases, and apparent separation—when the said distance decreases.

The directions of apparent joining of light spots in the view of both versions of the universal warning strip, depending on the observation distance, are shown in FIG. 1 and FIG. 2, according to which first of all apparent approaching of the light spots which are the closest to one another in the horizontal direction 17 dominates, this resulting in their apparent joining at the beginning of the second range of distinctness. In the second range of distinctness the dominating apparent approaching of other light spots occurs in the vertical direction 18, and their apparent joining occurs at the beginning of the third range of distinctness. In the said range of distinctness the directions of apparent joining of the closest spots are horizontal 19. In the view of the single version of the strip both the process of transformation of spots and the changes of the directions of apparent joining of light spots are completed, whereas at the observation of the strip of the double version there occurs still one more apparent joining of spots in the vertical direction 20.

FIG. 4 shows examples of the application of the universal warning strip on various vehicles, as seen, for example, in the third range of distinctness, namely on a motor-car 21, a motor-truck of a medium length 22 and a motor truck of a considerable length or with a trailer 23.

The design and the principle of application of the universal warning strip are based first of all on the following basic physical phenomena and laws and on the following physiological properties of the man: the phenomenon of light diffusion in the air, the phenomenon of irradiation, the resolution of the human eye, the ability of determining the distance in binocular vision, and the sensibility of accomodation changes of the human eye. this refers in a similar way to both the strip in its reflex version and the strip in its self-luminous version, i.e. comprising separate elements which are sources of light, for example, lamps or light-guides, or designed so that the source of light of larger dimensions is placed behind a perforated diaphragm, or designed in another way which produces a similar effect.

The aforementioned physical phenomena and physiological properties of the man are, of course, completely independent of the fact whether it is the presently used visual warning devices or the universal warning strip that are observed. However, it should be stressed that while the majority of the said phenomena, e.g. the phenomenon of light diffusion or irradiation, distinctly reduce the effectiveness of the devices presently used when the observation distance increases, among other by creation of a glow around the said devices which makes it difficult to distinguish details, they are regarded and made use of in full in the essence and the design of the universal warning strip.

Since the device according to the invention can be made of generally available reflex foil, requires only small space on a bumper or a car body, can be installed on all vehicles wider than the length of one module, should be unified, i.e. its modules should be of the same dimensions known to everyone, and the different heights of installing the device has less stronger effect upon the accuracy of estimation than it is in case of the presently used devices, thus it can be considered that the warning strip according to the invention possesses the characteristics of universality.

One of the characteristics of the device according to the invention, which determines its high effectiveness, is the dissimilarity of the shapes of the elements and the geometrical figures which constitute the particular types of classes of the said elements, seen from various distances as differentiated light spots. The said characteristic as well as resulting from it and connected with the simplicity of the design the easiness of distinguishing of the particular ranges of distinctness, the easiness of distinguishing and determining of the number of modules, causes that the device according to the invention—when the light of the head-lights of the observer's vehicle fall on it—renders it possible at the same time to notice the preceding vehicle early enough, to determine the distance from the said vehicle with high accuracy, to notice even small changes of the said distance, to distinguish the transverse dimension of the vehicle, to determine its width with high accuracy, and to distinguish the range of the length of the vehicle. On the other hand, the device according to the invention renders it impossible to assume the lights belonging to one vehicle as the lights placed on two different vehicles and prevents running into a parked vehicle, especially if a warning reflex triangle is not put up or is overturned by a strong wind.

Thus, application of the universal warning strip reduces considerably the number of cases of running into vehicles standing on the road, especially into unlighted vehicles, vehicles moving in the same direction, reduces the possibility of so-called chain collisions, and reduces the number of accidents resulting from overtaking of vehicles whose lengths are not distinguished previously.

The final form of the said device, i.e. its dimensions, shapes, the most advantageous ability of light reflection of the elements, and all types of spacings, are preferably established by means of an experimental method. The universal warning strip in its reflex embodiment can constitute the standard equipment of vehicles and can be manufactured in the form of self-adhesive tapes, stored, for example, in rolls and cut off so that the strip ready to be attached to a given vehicle contains the largest number of modules. Assuming that the reflex elements are, for example, yellow, then if they are placed on a yellow background, the universal warning strip will produce the desired effect only during the night—when it is lighted by the lights of the observer's vehicle, whereas if the reflex elements are placed on a background of a deep black colour, this will render it possible to obtan—to certain extent—the effects approximate to those described above also during the day.

It is conceivable that the universal warning strip in the self-luminous embodiment could find its application also as an auxiliary marking in the regions of airfields, sea ports and river ports.

The characteristics and advantages of the device according to the invention as presented in the present description, have been confirmed by the results of experiments.

What is claimed is:

1. A universal warning strip comprising: elements of selectively passive and active visual signalling including reflecting light and active and reflecting devices and being provided with an optical signal field comprising selectively passive and active light elements /1/ placed on a background which is essentially dark for emitting and reflecting light in a way different than that of the said elements, the elements being arranged in groups wherein the spacings between the said elements are essentially the same, said groups being arranged in sets of groups wherein the spacing between groups are essentially the same but larger than the spacing between the elements, the said sets being arranged in assemblages of sets wherein the spacings between sets are essentally the same but larger than the spacings between the groups, and any further enlargement of the signal field being obtained in a progressively analogical way, that is the spacings between the succeeding types of classes of light elements are essentially larger and larger, both the light elements and the particular types of classes of the said elements disposed and arranged for forming geometrical figures of different selected shapes.

* * * * *